US009952563B2

(12) United States Patent
Xiong et al.

(10) Patent No.: US 9,952,563 B2
(45) Date of Patent: Apr. 24, 2018

(54) SMART WATCH

(71) Applicant: Xiaomi Inc., Haidian District, Beijing (CN)

(72) Inventors: Xiaofeng Xiong, Beijing (CN); Zonglin Xue, Beijing (CN); Linchuan Wang, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 0 days.

(21) Appl. No.: 15/378,048

(22) Filed: Dec. 14, 2016

(65) Prior Publication Data

US 2017/0185053 A1 Jun. 29, 2017

(30) Foreign Application Priority Data

Dec. 29, 2015 (CN) .......................... 2015 1 1018197

(51) Int. Cl.

| | |
|---|---|
| ***H04M 1/00*** | (2006.01) |
| ***G04R 60/04*** | (2013.01) |
| ***G04R 60/06*** | (2013.01) |
| ***H01Q 1/27*** | (2006.01) |
| ***H01Q 1/44*** | (2006.01) |
| *H04B 1/38* | (2015.01) |

(52) U.S. Cl.

CPC ............ *G04R 60/04* (2013.01); *G04R 60/06* (2013.01); *H01Q 1/273* (2013.01); *H01Q 1/44* (2013.01)

(58) Field of Classification Search

CPC ........ G04R 60/04; G04R 60/06; H01Q 1/273; H01Q 1/44

USPC ...................................................... 455/575.7

See application file for complete search history.

(56) References Cited

U.S. PATENT DOCUMENTS

| | | | | |
|---|---|---|---|---|
| 6,175,729 B1 | 1/2001 | He et al. | | |
| 2005/0014541 A1 | 1/2005 | Clerc et al. | | |
| 2014/0354505 A1* | 12/2014 | Kwon ..................... | H01Q 1/48 343/848 | |

(Continued)

FOREIGN PATENT DOCUMENTS

| | | |
|---|---|---|
| CN | 1591969 A | 3/2005 |
| CN | 103943957 A | 7/2014 |
| CN | 203883126 U | 10/2014 |

(Continued)

OTHER PUBLICATIONS

Translation of CN203883126.Oct. 14, 2014.*

(Continued)

*Primary Examiner* — Lee Nguyen

(74) *Attorney, Agent, or Firm* — Jun He Law Offices P.C.; James J. Zhu

(57) ABSTRACT

A smart watch is provided. The smart watch includes: a dial having two ends; a first watchband; a second watchband, the first watchband and the second watchband being connected to the two ends of the dial, respectively; an RF (Radio Frequency) transceiver circuit built in the dial; a feeder arranged on a surface of the first watchband or arranged inside the first watchband; and a conductive connecting member connected to an end of the first watchband and having a non-closed structure, wherein the conductive connecting member is operable as an antenna to connect with the RF transceiver circuit via the feeder and as a first watchband connector to connect the first watchband and the second watchband.

8 Claims, 3 Drawing Sheets

(56) References Cited

U.S. PATENT DOCUMENTS

2017/0062907 A1* 3/2017 Kim ........................ H01Q 1/243

FOREIGN PATENT DOCUMENTS

| | | | |
|---|---|---|---|
| CN | 104538741 | A | 4/2015 |
| CN | 204378100 | U | 6/2015 |
| CN | 204462670 | U | 7/2015 |
| CN | 104856379 | A | 8/2015 |
| CN | 204708155 | U | 10/2015 |
| DE | 4338674 | A1 | 5/1995 |
| JP | 2015046718 | A | 3/2015 |
| WO | 2015029610 | A1 | 3/2015 |

OTHER PUBLICATIONS

Extended European Search Report of European Patent Application No. 16205413.4, from the European Patent Office, dated May 30, 2017.

* cited by examiner

Fig. 1
Dial 1
First Watchband 2
Second Watchband 3

SMART WATCH

CROSS REFERENCE TO RELATED APPLICATIONS

This application is based on and claims the priority of the Chinese patent application No. 201511018197.2, filed on Dec. 29, 2015, which is incorporated herein by reference in its entirety.

TECHNICAL FIELD

The present disclosure relates to the field of terminal technology, and more particularly to a smart watch.

BACKGROUND

With the rapid development of terminal technology, smart watches for children are becoming more and more popular. In order to realize a communication function, the smart watches are usually equipped with antennas.

Because of the existence of the antennas, radiation of the smart watches has received close attentions from various parties. It has been reported that, when a smart watch is used for answering a call, instantaneous radiation generated by the smart watch is much greater than (perhaps even 1,000 times greater than) that generated by a mobile terminal.

Typically, the antennas of smart watches are arranged in dials. Because a user usually wears a watch in such a manner that the dial faces towards his/her head, the amount of radiation to the head far exceeds a safe level when the user makes a call.

SUMMARY

The present disclosure provides a smart watch. The smart watch includes a dial having two ends; a first watchband; a second watchband, the first watchband and the second watchband being connected to the two ends of the dial, respectively; an RF (Radio Frequency) transceiver circuit built in the dial; a feeder arranged on a surface of the first watchband or arranged inside the first watchband; and a conductive connecting member connected to an end of the first watchband and having a non-closed structure, wherein the conductive connecting member is operable as an antenna to connect with the RF transceiver circuit via the feeder and as a first watchband connector to connect the first watchband and the second watchband.

It should be understood that both the foregoing general description and the following detailed description are only exemplary and explanatory and are not restrictive of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
FIG. 1 is a schematic diagram illustrating an appearance of a smart watch according to an exemplary embodiment.
Figure 2:
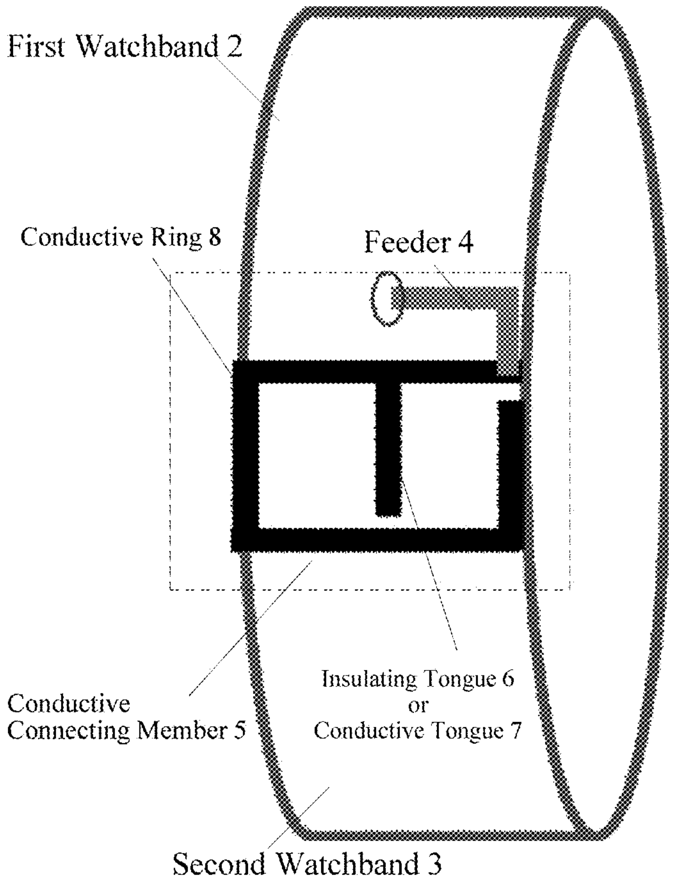
FIG. 2 is a structure diagram of a smart watch according to an exemplary embodiment.

Each of FIG. 1 and FIG. 2 shows a structure diagram of a smart watch according to an exemplary embodiment. For details of the structure enclosed by a dotted frame in FIG. 1, reference can be made to that enclosed by a dotted frame in FIG. 2. As shown in FIG. 1, the smart watch includes a dial 1, a first watchband 2 and a second watchband 3. An RF transceiver circuit (not shown) is built in the dial 1.

As shown in FIG. 2, the smart watch further includes: a feeder 4 arranged on a surface of the first watchband 2 or arranged inside the first watchband 2; and a conductive connecting member 5 connected to an end of the first watchband 2. The conductive connecting member 5 has a non-closed structure and operates as an antenna that is connected with the RF transceiver circuit (not shown in the connection relation diagram) via the feeder 4. The conductive connecting member 5 operates as a first watchband connector that connects the first watchband 2 and the second watchband 3.

The feeder 4 may be arranged on the surface of the first watchband 2 or arranged inside the first watchband 2. The case where the feeder 4 is arranged on the surface of the first watchband 2 is shown in FIG. 2. The case where the feeder 4 is arranged inside the first watchband 2 is similar to the case where the feeder 4 is arranged on the surface of the first watchband 2, and will not be repeated here. In FIG. 2, enclosed by the elliptical solid line is a feeding point. The antenna can be connected with the RF transceiver circuit via the feeder 4 so as to transmit a signal received by the antenna to the RF transceiver circuit for processing, or to transmit a signal required to be sent by the RF transceiver circuit to the antenna for transmission. In the smart watch, the total length of the antenna can be effectively reduced by utilizing capacitive coupling of a bending structure of the conductive connecting member.

In this embodiment, considering the habitual posture of a child using the smart watch to make a call, the antenna is shaped integrally with the watchband connector. That is, the conductive connecting member is used as not only the watchband connector but also the antenna, thereby enabling the antenna to face a direction opposite to the head. As such, direct radiation of electromagnetic waves to the child's head is reduced for the electromagnetic waves are blocked by an arm and the dial, and the production cost of the antenna is reduced. Therefore, the smart watch is high in practicality.

The conductive connecting member 5 may be arranged in a plurality of manners, as will be illustrated hereinafter.

In some embodiments, as shown in FIG. 2, the conductive connecting member 5 is a conductive ring 8 having an opening. The smart watch further includes an insulating tongue 6 rotatably connected with the conductive ring 8. The insulating tongue 6 is used as a second watchband connector that cooperates with the first watchband connector to connect the first watchband 2 and the second watchband 3.

As such, it is possible that only the conductive ring 8 is used as the antenna and the insulating tongue 6 is only used as the second watchband connector that cooperates with the first watchband connector to connect the first watchband 2 and the second watchband 3. The non-closed structure of the conductive ring 8 may be implemented by, but not limited to, the opening formed on the conductive ring 8.

In some embodiments, as shown in FIG. 2, the conductive connecting member 5 includes a conductive tongue 7 and a conductive ring 8 having an opening. One end of the conductive tongue 7 is electrically and rotatably connected with the conductive ring 8; and the other end of the conductive tongue 7 is insulated from the position where the conductive ring 8 is in contact when the conductive tongue 7 is rotated to the other end in contact with the conductive ring 8.

As such, the conductive ring 8 and the conductive tongue 7 may be used together as the antenna. Then, both the conductive ring 8 and the conductive tongue 7 are used as the first watchband connector to connect the first watchband 2 and the second watchband 3. The non-closed structure of the conductive ring 8 may be implemented by, but not limited to, the opening formed on the conductive ring 8. In order to ensure performance of the antenna, the other end of the conductive tongue 7 is insulated from the position where the conductive ring is in contact when the conductive tongue 7 is rotated to the other end in contact with the conductive ring 8. This can be implemented in various manners such as by applying an insulating material on the point of contact.

In the above embodiments, the opening on the conductive ring 8 is provided for implementing the monopole antenna. The smart watch using a mobile network may use a GSM (Global System for Mobile Communications) network (which is used for voice communications) and a GPRS (General Packet Radio Service) network (which is used for sending location information, voice messages, games, control functions, etc.), namely the so-called 2G and 2.5 G networks. Thus, a communication frequency band (850-960 MHz) in the 2G network may be selected as a target frequency band during antenna design, and the length of the monopole antenna (which is a distance from the feeding point to a gap of the antenna) is thus about ¼ wavelength, namely 88 mm. The total length of the antenna can be effectively reduced by utilizing capacitive coupling between the bending structure of the conductive ring 8 and the conductive tongue 7, thereby effectively reducing the cost.

In the above embodiments, the second watchband 3 includes at least one hole matching the conductive tongue 7 or the insulating tongue 6. The number of the at least one hole may be set as required. If a user needs to wear the smart watch, the conductive tongue 7 or the insulating tongue 6 is inserted into the hole to securely connect the first watchband 2 with the second watchband 3. The user can adjust the wearing length of the watchband to fit the wrist by selecting a proper hole in which the conductive tongue 7 or the insulating tongue 6 is inserted, thereby realizing the optimal wearing length.

The shape of the conductive ring 8 and the position of the opening on the conductive ring 8 may be set according to actual needs. The shape of the conductive ring 8 may be regular (such as rectangular, circular or oval), or may be irregular. For example, if the conductive ring 8 is rectangular or circular, the opening is located at a corner of the rectangular or circular conductive ring 8, and the feeder 4 is connected to an end of the conductive ring 8 at the corner.

The conductive ring 8, the conductive tongue 7 and the feeder 4 are each made of an alloy or a metal, such as steel, aluminum, copper or the like, and preferably of steel.

The feeder 4 is made by using a LDS (Laser Direct Structuring) process. The process of arranging the feeder 4 may be different according to different positions of the feeder 4. If the feeder 4 is arranged on the surface of the first watchband 2, an alloy or a metal may be directly printed on the first watchband 2 via the LDS process. If the feeder 4 is arranged inside the first watchband 2, there are various implementations. For example, the first watchband 2 may be cross-sectioned first, and then the alloy or the metal may be directly printed on a cross section of the first watchband 2. The LDS process is simple, convenient to operate and easy to implement. The first watchband 2 and the second watchband 3 may be made of plastic, leather or the like.

Figure 3:
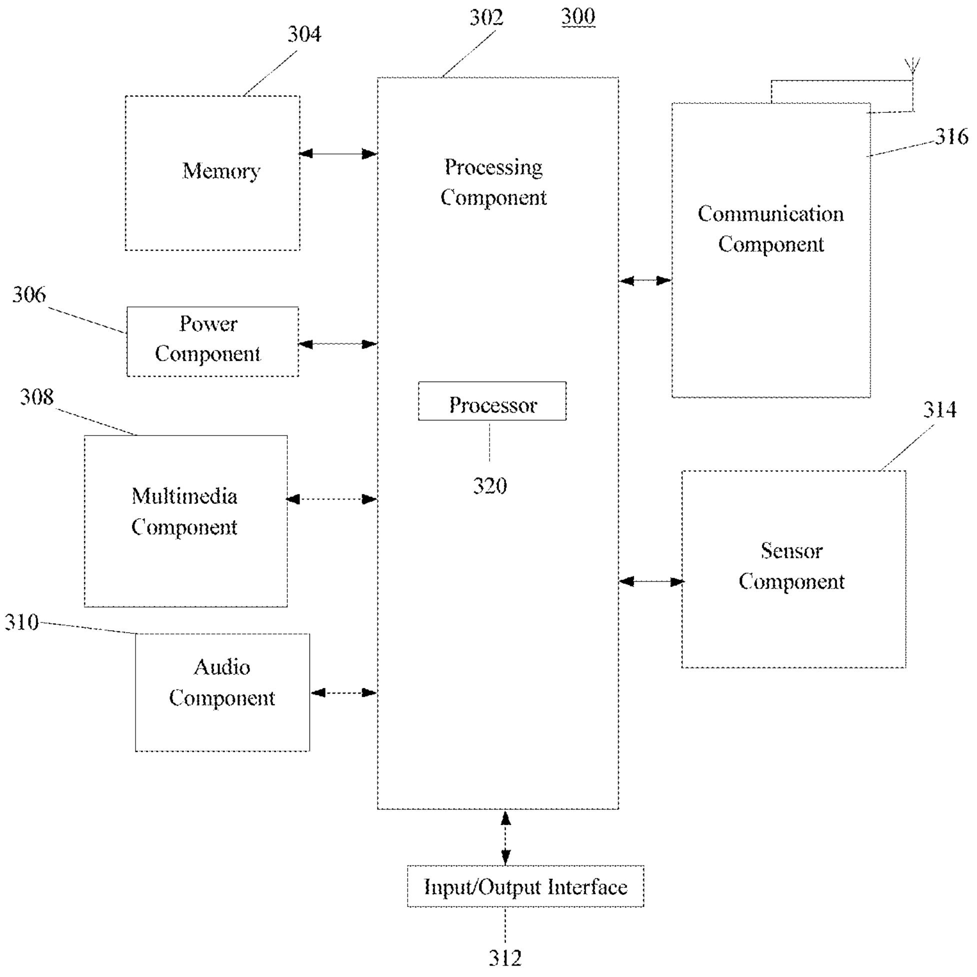
FIG. 3 is a block diagram of an apparatus according to an exemplary embodiment.

FIG. 3 is a block diagram of an apparatus 300 according to an exemplary embodiment. For example, the apparatus 300 may be a mobile phone, a computer, a digital broadcast terminal, a message transceiver, a game console, a tablet device, a medical device, fitness equipment, a personal digital assistant or the like.

Referring to FIG. 3, the apparatus 300 may include one or more of the following components: a processing component 302, a memory 304, a power component 306, a multimedia component 308, an audio component 310, an input/output (I/O) interface 312, a sensor component 314 and a communication component 316.

The processing component 302 typically controls overall operations of the apparatus 300, such as the operations associated with display, telephone calls, data communications, camera operations and recording operations. The processing component 302 may include one or more processors 320 to execute instructions to perform all or part of the steps in the above described methods. Moreover, the processing component 302 may include one or more modules which facilitate the interaction between the processing component 302 and other components. For example, the processing component 302 may include a multimedia module to facilitate the interaction between the multimedia component 308 and the processing component 302.

The memory 304 is configured to store various types of data to support the operation of the apparatus 300. Examples of such data include instructions for any applications or methods operated on the apparatus 300, contact data, phonebook data, messages, pictures, video, etc. The memory 304 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 provides power to various components of the apparatus 300. The power component 306 may include a power management system, one or more power sources, and any other components associated with the generation, management, and distribution of power in the apparatus 300.

The multimedia component 308 includes a screen providing an output interface between the apparatus 300 and the user. In some embodiments, the screen may include a liquid crystal display (LCD) and a touch panel (TP). If the screen comprises the touch panel, the screen may be implemented as a touch screen to receive input signals from the user. The touch panel includes one or more touch sensors to sense touches, swipes and gestures on the touch panel. The touch sensors may not only sense a boundary of a touch or swipe action, but also sense a period of time and a pressure associated with a touch or swipe action. In some embodiments, the multimedia component 308 includes a front camera and/or a rear camera. The front camera and/or the rear camera may receive an external multimedia datum while the apparatus 300 is in an operation mode, such as a photographing mode or a video mode. Each of the front and rear cameras may be a fixed optical lens system or have a focus and optical zoom capability.

The audio component 310 is configured to output and/or input audio signals. For example, the audio component 310 includes a microphone (MIC) configured to receive an external audio signal when the apparatus 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the apparatus 300. For instance, the sensor component 314 may detect an open/closed status of the apparatus 300, relative positioning of components, e.g., the display and the keypad, of the apparatus 300, a change in position of the apparatus 300 or a component of the apparatus 300, a presence or absence of user's contact with the apparatus 300, an orientation or an acceleration/deceleration of the apparatus 300, and a change in temperature of the apparatus 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may also include an accelerometer sensor, a gyroscope sensor, a magnetic sensor, a pressure sensor or a temperature sensor.

The communication component 316 is configured to facilitate communication, wired or wirelessly, between the apparatus 300 and other devices. The apparatus 300 can access a wireless network based on a communication standard, such as WiFi, 2G, or 3G, or a combination thereof. In one exemplary embodiment, the communication component 316 receives a broadcast signal or broadcast associated information from an external broadcast management system via a broadcast channel. In one exemplary embodiment, the communication component 316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium comprising instructions, such as included in the memory 304, executable by the processor 320 in the apparatus 300, for performing the above-described methods. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A smart watch, comprising:

a dial having two ends;

a first watchband;

a second watchband, the first watchband and the second watchband being connected to the two ends of the dial, respectively;

an RF (Radio Frequency) transceiver circuit built in the dial;

a feeder arranged on a surface of the first watchband or arranged inside the first watchband; and a conductive connecting member connected to an end of the first watchband and having a non-closed structure, wherein the conductive connecting member is operable as an antenna to connect with the RF transceiver circuit via the feeder and as a first watchband connector to connect the first watchband and the second watchband;

wherein the conductive connecting member comprises:

a conductive ring having an opening; and a conductive tongue having two ends, wherein one end of the conductive tongue is electrically and rotatably connected with the conductive ring, and the other end of the conductive tongue is insulated from the position where the conductive ring is in contact when the conductive tongue is rotated to the other end in contact with the conductive ring.

2. The smart watch of claim 1, wherein the second watchband comprises a hole matching the conductive tongue.

3. The smart watch of claim 1, wherein the conductive ring is rectangular or circular, and the opening is located at a corner of the conductive ring; and the feeder is connected with one end of the conductive ring at the corner.

4. The smart watch of claim 1, wherein the conductive ring is made of an alloy or a metal.

5. The smart watch of claim 1, wherein the conductive tongue is made of an alloy or a metal.

6. The smart watch of claim 1, wherein the feeder is made of an alloy or a metal.

7. The smart watch of claim 1, wherein the feeder is made by using a laser direct structuring process.

8. The smart watch of claim 1, wherein the antenna is a monopole antenna.

* * * * *